(12) United States Patent
SanGiovanni et al.

(10) Patent No.: US 10,282,080 B2
(45) Date of Patent: *May 7, 2019

(54) SINGLE-HANDED APPROACH FOR NAVIGATION OF APPLICATION TILES USING PANNING AND ZOOMING

(71) Applicant: Apple Inc., Cupertino, CA (US)

(72) Inventors: John SanGiovanni, Seattle, WA (US); Daniel C. Robbins, Seattle, WA (US)

(73) Assignee: APPLE INC., Cupertino, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 15/229,058

(22) Filed: Aug. 4, 2016

(65) Prior Publication Data

US 2016/0342300 A1  Nov. 24, 2016

Related U.S. Application Data

(63) Continuation of application No. 13/341,719, filed on Dec. 30, 2011, now Pat. No. 9,411,505, which is a
(Continued)

(51) Int. Cl.
*G06F 3/0488* (2013.01)
*G06F 3/0485* (2013.01)
(Continued)

(52) U.S. Cl.
CPC .......... *G06F 3/0485* (2013.01); *G06F 3/0482* (2013.01); *G06F 3/0488* (2013.01);
(Continued)

(58) Field of Classification Search
CPC .. G06F 3/0485; G06F 3/0488; G06F 3/04883; G06F 3/04886; G06F 2203/04806
See application file for complete search history.

(56) References Cited

U.S. PATENT DOCUMENTS 5,463,725 A   10/1995   Henckel et al.
5,563,996 A   10/1996   Tchao
(Continued)

OTHER PUBLICATIONS

Amin et al., "GeoPhoenix Products to Improve the Customer Experience", GeoPhoenix Incorporated, Cleveland, Ohio, 1998, 2 pages.
(Continued)

*Primary Examiner* — Amy Ng
*Assistant Examiner* — William Wong
(74) *Attorney, Agent, or Firm* — Morgan, Lewis & Bockius LLP

(57) ABSTRACT

Unique interactive systems and methods that facilitate single-handed navigation and interaction with applications within a display space on any type of mobile computing device are provided. Embodiments include or employ scalable application tiles corresponding to applications, whereby the application tiles can provide or indicate the current state of the corresponding application. State information provided in each tile can vary as well depending on the current size of the tile. Tiles can be arranged into a plurality of zones such that a user can view one zone at a time and obtain context and information from the application tiles in that zone rather than working with all tiles and all zones simultaneously. The view of the display space can be of the world or all application tiles, zone, or application. Panning and zooming among the zones, application tiles and/or views can also be performed.

24 Claims, 17 Drawing Sheets

Related U.S. Application Data continuation of application No. 11/061,218, filed on Feb. 18, 2005, now Pat. No. 8,819,569.

(51) Int. Cl.
*G06F 3/0482* (2013.01)
*G06Q 30/06* (2012.01)
*G06T 13/80* (2011.01)

(52) U.S. Cl.
CPC ..... *G06F 3/04883* (2013.01); *G06Q 30/0643* (2013.01); *G06T 13/80* (2013.01)

(56) References Cited

U.S. PATENT DOCUMENTS

| | | |
|---|---|---|
| 5,581,670 A | 12/1996 | Bier et al. |
| 5,615,384 A | 3/1997 | Allard et al. |
| 5,886,697 A | 3/1999 | Naughton et al. |
| 5,929,853 A | 7/1999 | Guha |
| 6,002,403 A | 12/1999 | Sugiyama et al. |
| 6,037,937 A | 3/2000 | Beaton et al. |
| 6,084,598 A | 7/2000 | Chekerylla |
| 6,160,553 A | 12/2000 | Robertson et al. |
| 6,166,738 A | 12/2000 | Robertson et al. |
| 6,208,335 B1 | 3/2001 | Gordon et al. |
| 6,229,542 B1 | 5/2001 | Miller |
| 6,239,803 B1 | 5/2001 | Driskell |
| 6,340,979 B1 | 1/2002 | Beaton et al. |
| 6,356,283 B1 | 3/2002 | Guedalia |
| 6,448,956 B1 | 9/2002 | Berman et al. |
| 6,463,343 B1 | 10/2002 | Emens et al. |
| 6,583,800 B1 | 6/2003 | Ridgley et al. |
| 6,618,063 B1 | 9/2003 | Kurtenbach |
| 6,639,613 B1 | 10/2003 | Nason et al. |
| 6,686,936 B1 | 2/2004 | Nason et al. |
| 6,690,387 B2 | 2/2004 | Zimmerman et al. |
| 6,700,612 B1 | 3/2004 | Anderson et al. |
| 6,717,596 B1 | 4/2004 | Nason et al. |
| 6,724,400 B1 | 4/2004 | Anderson |
| 6,731,316 B2 | 5/2004 | Herigstad et al. |
| 6,765,559 B2 | 7/2004 | Hayakawa |
| 6,775,659 B2 | 8/2004 | Clifton-Bligh |
| 6,879,332 B2 | 4/2005 | Decombe |
| 6,883,143 B2 | 4/2005 | Driskell |
| 6,888,554 B1 | 5/2005 | Decombe |
| 6,961,731 B2 | 11/2005 | Holbrook |
| 7,036,091 B1 | 4/2006 | Nguyen |
| 7,146,574 B2 | 12/2006 | Goldthwaite et al. |
| 7,149,982 B1 | 12/2006 | Duperrouzel et al. |
| 7,228,507 B2 | 6/2007 | Good et al. |
| D549,713 S | 8/2007 | Lewin et al. |
| 7,296,243 B2 | 11/2007 | Lira |
| 7,327,349 B2 | 2/2008 | Robbins et al. |
| 7,336,279 B1* | 2/2008 | Takiguchi ......... G06F 17/30126 345/473 |
| 7,356,777 B2 | 4/2008 | Borchardt et al. |
| 7,418,671 B2 | 8/2008 | Hama et al. |
| 7,441,207 B2 | 10/2008 | Filner et al. |
| 7,600,192 B1 | 10/2009 | Hashimoto et al. |
| 7,600,201 B2 | 10/2009 | Endler et al. |
| 8,237,712 B2 | 8/2012 | Fagans |
| 2001/0030662 A1 | 10/2001 | Ohkawa et al. |
| 2001/0030667 A1 | 10/2001 | Kelts |
| 2001/0032221 A1 | 10/2001 | Anwar |
| 2001/0035885 A1 | 11/2001 | Iron et al. |
| 2001/0045965 A1 | 11/2001 | Orbanes et al. |
| 2002/0000998 A1 | 1/2002 | Scott et al. |
| 2002/0032696 A1 | 3/2002 | Takiguchi et al. |
| 2002/0051017 A1 | 5/2002 | Wishoff |
| 2002/0054172 A1 | 5/2002 | Berman et al. |
| 2002/0059604 A1 | 5/2002 | Papagan et al. |
| 2002/0060699 A1 | 5/2002 | D'Agostini |
| 2002/0089541 A1 | 7/2002 | Orbanes |
| 2002/0089549 A1 | 7/2002 | Munro et al. |
| 2002/0100063 A1 | 7/2002 | Herigstad et al. |
| 2002/0112082 A1 | 8/2002 | Ko et al. |
| 2002/0112237 A1* | 8/2002 | Kelts ............... G06F 3/0481 725/39 |
| 2002/0113778 A1 | 8/2002 | Rekimoto et al. |
| 2002/0113816 A1 | 8/2002 | Mitchell et al. |
| 2002/0126121 A1 | 9/2002 | Robbins |
| 2002/0144233 A1 | 10/2002 | Chong |
| 2002/0145620 A1 | 10/2002 | Smith et al. |
| 2002/0152222 A1 | 10/2002 | Holbrook |
| 2003/0011635 A1 | 1/2003 | Hasha et al. |
| 2003/0016247 A1 | 1/2003 | Lai et al. |
| 2003/0020671 A1 | 1/2003 | Santoro et al. |
| 2003/0043200 A1 | 3/2003 | Faieta et al. |
| 2003/0169282 A1 | 9/2003 | Herigstad et al. |
| 2003/0179237 A1 | 9/2003 | Nelson et al. |
| 2003/0179239 A1 | 9/2003 | Lira |
| 2003/0189597 A1 | 10/2003 | Anderson et al. |
| 2003/0197736 A1 | 10/2003 | Murphy |
| 2003/0222917 A1 | 12/2003 | Trantow |
| 2004/0027395 A1 | 2/2004 | Lection et al. |
| 2004/0046795 A1 | 3/2004 | Josephson et al. |
| 2004/0046799 A1 | 3/2004 | Gombert et al. |
| 2004/0048607 A1 | 3/2004 | Kim |
| 2004/0135824 A1 | 7/2004 | Fitzmaurice |
| 2004/0141010 A1 | 7/2004 | Fitzmaurice et al. |
| 2004/0174400 A1 | 9/2004 | Herigstad et al. |
| 2004/0221243 A1 | 11/2004 | Twerdahl et al. |
| 2004/0233219 A1 | 11/2004 | Aguera y Arcas |
| 2004/0252119 A1* | 12/2004 | Hunleth ............ G06F 3/0482 345/440 |
| 2004/0257340 A1 | 12/2004 | Jawerth |
| 2004/0268413 A1 | 12/2004 | Reid et al. |
| 2005/0005241 A1 | 1/2005 | Hunleth et al. |
| 2005/0022139 A1 | 1/2005 | Gettman et al. |
| 2005/0027408 A1 | 2/2005 | Donoghue et al. |
| 2005/0044058 A1 | 2/2005 | Matthews et al. |
| 2005/0050476 A1 | 3/2005 | SanGiovanni |
| 2005/0057524 A1 | 3/2005 | Hill et al. |
| 2005/0076303 A1 | 4/2005 | Vaananen et al. |
| 2005/0086612 A1 | 4/2005 | Gettman et al. |
| 2005/0091596 A1 | 4/2005 | Anthony et al. |
| 2005/0134578 A1 | 6/2005 | Chambers et al. |
| 2005/0138570 A1 | 6/2005 | Good et al. |
| 2005/0183041 A1 | 8/2005 | Chiu et al. |
| 2005/0188329 A1* | 8/2005 | Cutler ............... G06F 3/0481 715/804 |
| 2005/0195154 A1 | 9/2005 | Robbins et al. |
| 2005/0197763 A1 | 9/2005 | Robbins et al. |
| 2005/0210399 A1 | 9/2005 | Filner et al. |
| 2005/0216858 A1 | 9/2005 | Fabritius |
| 2005/0223341 A1 | 10/2005 | Repka |
| 2005/0229102 A1 | 10/2005 | Watson et al. |
| 2005/0240965 A1 | 10/2005 | Watson et al. |
| 2005/0268247 A1 | 12/2005 | Baneth |
| 2005/0270288 A1 | 12/2005 | Arcas |
| 2005/0270311 A1 | 12/2005 | Rasmussen et al. |
| 2006/0010395 A1 | 1/2006 | Aaltonen |
| 2006/0026536 A1 | 2/2006 | Hotelling et al. |
| 2006/0053388 A1 | 3/2006 | Michelman |
| 2006/0123183 A1 | 6/2006 | Koivisto et al. |
| 2006/0136964 A1 | 6/2006 | Diez et al. |
| 2006/0156228 A1* | 7/2006 | Gallo ............... G06F 3/0481 715/202 |
| 2006/0161863 A1 | 7/2006 | Gallo |
| 2006/0184966 A1* | 8/2006 | Hunleth ............ G06F 3/017 725/39 |
| 2007/0082707 A1 | 4/2007 | Flynt et al. |
| 2007/0152961 A1 | 7/2007 | Dunton et al. |
| 2007/0157232 A1 | 7/2007 | Dunton et al. |
| 2007/0192739 A1 | 8/2007 | Hunleth et al. |

OTHER PUBLICATIONS

Kunkel, "Digital Dreams: The Work of the Sony Design Center", Universe Publishing, New York, NY, Sep. 4, 1999, 3 pages.
Locke, "Windsor Interfaces, Inc.—Natural Software for Real People", http://www.windorinterfaces.com/index.shtml, 2006, 1 page.

(56) References Cited

OTHER PUBLICATIONS

Office Action, dated Sep. 21, 2007, received in U.S. Appl. No. 11/061,218, 15 pages.
Final Office Action, dated Mar. 26, 2008, received in U.S. Appl. No. 11/061,218, 19 pages.
Office Action, dated Sep. 18, 2008, received in U.S. Appl. No. 11/061,218, 19 pages.
Office Action, dated Feb. 26, 2009, received in U.S. Appl. No. 11/061,218, 20 pages.
Final Office Action, dated Aug. 19, 2009, received in U.S. Appl. No. 11/061,218, 21 pages.
Office Action, dated Feb. 3, 2010, received in U.S. Appl. No. 11/061,218, 21 pages.
Final Office Action, dated Sep. 2, 2010, received in U.S. Appl. No. 11/061,218, 28 pages.
Final Office Action, dated Feb. 17, 2011, received in U.S. Appl. No. 11/061,218, 29 pages.
Final Office Action, dated Jun. 8, 2011, received in U.S. Appl. No. 11/061,218, 32 pages.
Office Action, dated May 9, 2012, received in U.S. Appl. No. 11/061,218, 29 pages.
Final Office Action, dated Mar. 15, 2013, received in U.S. Appl. No. 11/061,218, 23 pages.
Office Action, dated Sep. 25, 2013, received in U.S. Appl. No. 11/061,218, 24 pages.
Notice of Allowance, dated May 23, 2014, received in U.S. Appl. No. 11/061,218, 16 pages.
Office Action, dated May 31, 2012, received in U.S. Appl. No. 13/341,719, 16 pages.
Final Office Action, dated May 3, 2013, received in U.S. Appl. No. 13/341,719, 19 pages.
Office Action, dated Nov. 19, 2013, received in U.S. Appl. No. 13/341,719, 23 pages.
Final Office Action, dated Jul. 8, 2014, received in U.S. Appl. No. 13/341,719, 20 pages.
Office Action, dated Mar. 3, 2015, received in U.S. Appl. No. 13/341,719, 15 pages.
Final Office Action, dated Oct. 8, 2015, received in U.S. Appl. No. 13/341,719, 18 pages.
Notice of Allowance, dated Apr. 6, 2016, received in U.S. Appl. No. 13/341,719, 15 pages.

* cited by examiner

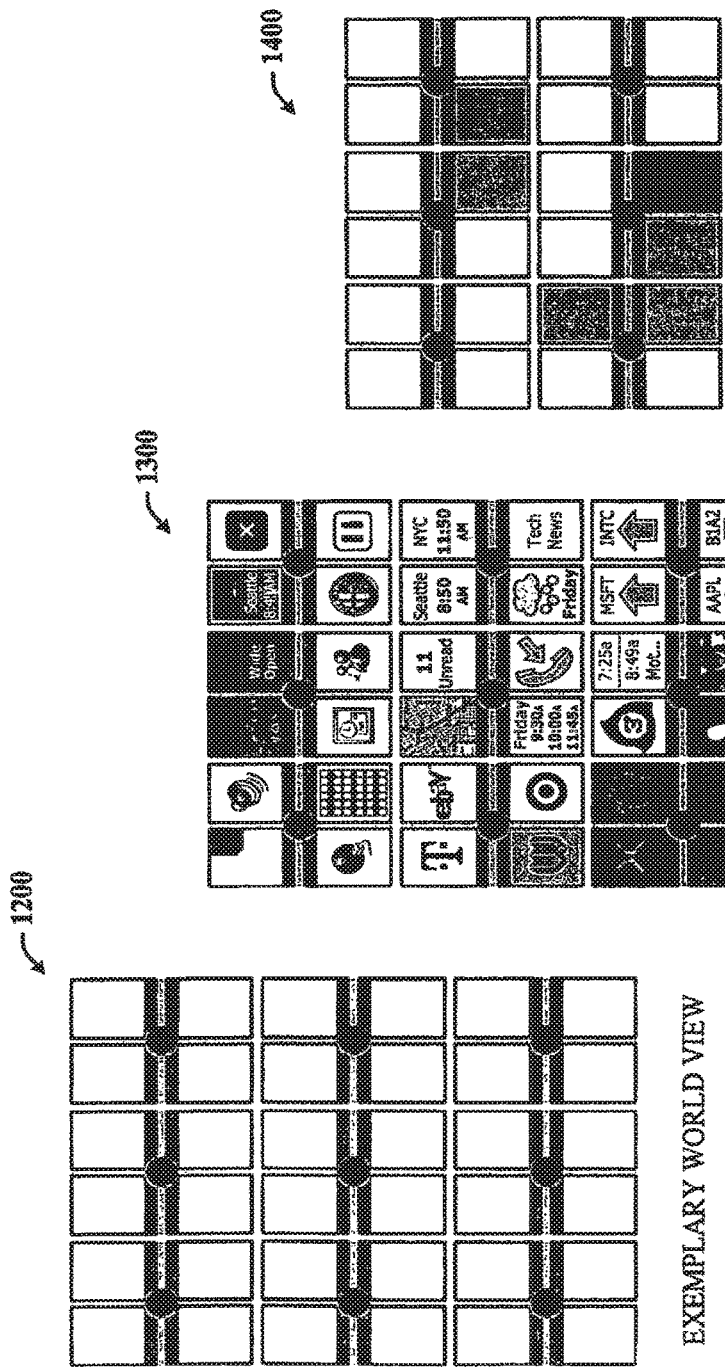
FIG. 12 EXEMPLARY WORLD VIEW
FIG. 13 SCALED APPLICATION REPRESENTATIONS
FIG. 14 SHOWING ONLY FLASHING NOTIFICATIONS (IN COLOR)

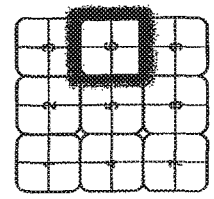
VIEW IS CENTERED ON ZONE 6
FIG. 17
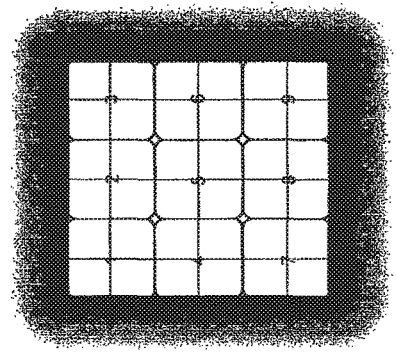
VIEW IS ZOOMED OUT TO SHOW ALL ZONES ("WORLD" VIEW)
FIG. 19
VIEW IS CENTERED ON ZONE 2
FIG. 16
VIEW IS CENTERED ON "HOME" ZONE (5)
FIG. 15
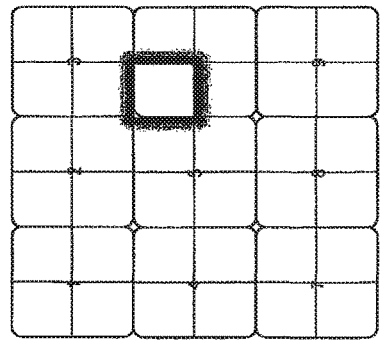
VIEW IS CENTERED ON TILE 17 ("APPLICATION" VIEW)
FIG. 18

SINGLE-HANDED APPROACH FOR NAVIGATION OF APPLICATION TILES USING PANNING AND ZOOMING

RELATED APPLICATIONS

This application is a continuation of U.S. application Ser. No. 13/341,719, filed Dec. 30, 2011, which is a continuation of U.S. application Ser. No. 11/061,218, filed Feb. 18, 2005, which is now U.S. Pat. No. 8,819,569, which are incorporated herein by reference in their entireties.

TECHNICAL FIELD

The subject invention relates generally to navigating in a two-dimensional space and in particular, to navigating through a data-set at multiple levels of magnification or direction with a single hand in a mobile environment.

BACKGROUND OF THE INVENTION

Interest in creating rich user experiences on small portable devices has grown in parallel with the proliferation of mobile computing devices, PDAs, and cell-phones built on mature computing platforms. The growth of the computational power of these devices has continued against the relatively constant display and navigation bottlenecks they pose to users. Small portable computing devices only provide a limited view of a given information space. The limited input modalities make it difficult for small form-factor devices to support both incremental and ballistic (rapid navigation towards a target typically initiated by a command or button press) navigation of large datasets. Because these devices are often used in mobile situations where a user's attention is divided, interactions that require precise control are challenging.

Unfortunately, conventional platforms employed in mobile computing devices often demand the close attention of the user. For example, the spatial location of information may vary among different mobile devices, making the user spend time to look for the desired information. Furthermore, the spatial location of the information may not necessarily correspond to the importance of the information to the user. Hence, there is much room for improvement of these types of devices for the time-conscious and on-the-go consumer.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention relates to a system and/or methodology that facilitate enhanced single-handed navigation of and interaction with displayed information in a more uniform manner across different types of mobile computing devices. More specifically, the system and method provide several different approaches for relaying and displaying information at various levels of detail to the user and for allowing the viewing of information in a quick but passive manner by the user. Thus, a more interactive display space can be produced.

For instance, one aspect of the subject invention employs dynamic application tiles that can identify the application as well as provide an indication of the type of information that is hosted by the application and the application's current state to the user. Traditional systems typically use a fixed graphic or image (e.g., icon) to represent the application which remains static despite changes to the application or its state.

Furthermore, the invention provides for clustering multiple application tiles into collections. Each collection can be referred to and displayed as a region or zone. In practice, for example, a region or zone can include a set number of application tiles. The tiles can be grouped according to type and/or according to user preference. That is, the user may be permitted to modify default collections of tiles. Once the application tiles are arranged in this manner, the user can view each collection of tiles separately from the others such as one zone at a time and hence, in more detail than would otherwise be possible. Alternatively or in addition, the user can view a plurality of tile collections at the same time according to the zoom depth of the display space, for example.

When viewing any one particular zone of tiles, the user can maintain his/her orientation or zone position within the display space by observing a position or depth gauge on the display. For example, when additional zones exist to the right of the user's current zone, the position gauge can indicate to the user that more information exists to the right such as by displaying a right arrow indicator. The depth gauge can tell the user how deep the current view is within the display space (e.g., how far into the display space that the user's view resides). By watching the depth gauge during a zoom process, the user can also verify that a current view is being zoomed into a more detailed view or is being zoomed out to a less detailed view.

According to another aspect of the invention, single-handed navigation of the display space can be accomplished in part by mapping the display space to the device's keypad. When no keypad is available, an on-screen button can be made visible to the user and be used to pan across and/or zoom in or out of the display space when contacted by the user either directly (e.g., user's thumb) or indirectly (e.g., joystick). Single-handed navigation can be used when panning across the application tiles and/or when zooming in and out of various views to see more or less application tiles at any given time. For example, with a multi-directional pad either on-screen or mapped to a keypad or joystick, the user can nudge or move in a desired direction to see other tiles or collections of tiles.

Due to the nature of the subject invention, the system and method can be utilized on a wide array of hardware configurations including touch-sensitive devices, mobile phone keypad and joystick devices, and/or devices with a capacitive touchpad. As a result, hardware manufacturers and application programmers need not make substantial adaptations when creating new hardware or new applications for use in the subject environment.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may

BRIEF DESCRIPTION OF THE DRAWINGS

FIG. 12 is a schematic diagram of an exemplary world view of application tiles and zones in the display space of a mobile computing device in accordance with an aspect of the subject invention.

FIG. 13 is a schematic diagram illustrating scaled application representations organized into a plurality of regions or zones in the display space of a mobile computing device in accordance with an aspect of the subject invention.

FIG. 14 is a schematic diagram that shows only "flashing" application tiles (in color) which indicate a change in state in accordance with an aspect of the subject invention.

FIGS. 15-19 are schematic diagrams of a plurality of zones mapped to a keypad of a mobile computing device to facilitate navigation of the zones in accordance with an aspect of the subject invention.

DETAILED DESCRIPTION OF THE INVENTION

Figure 1:
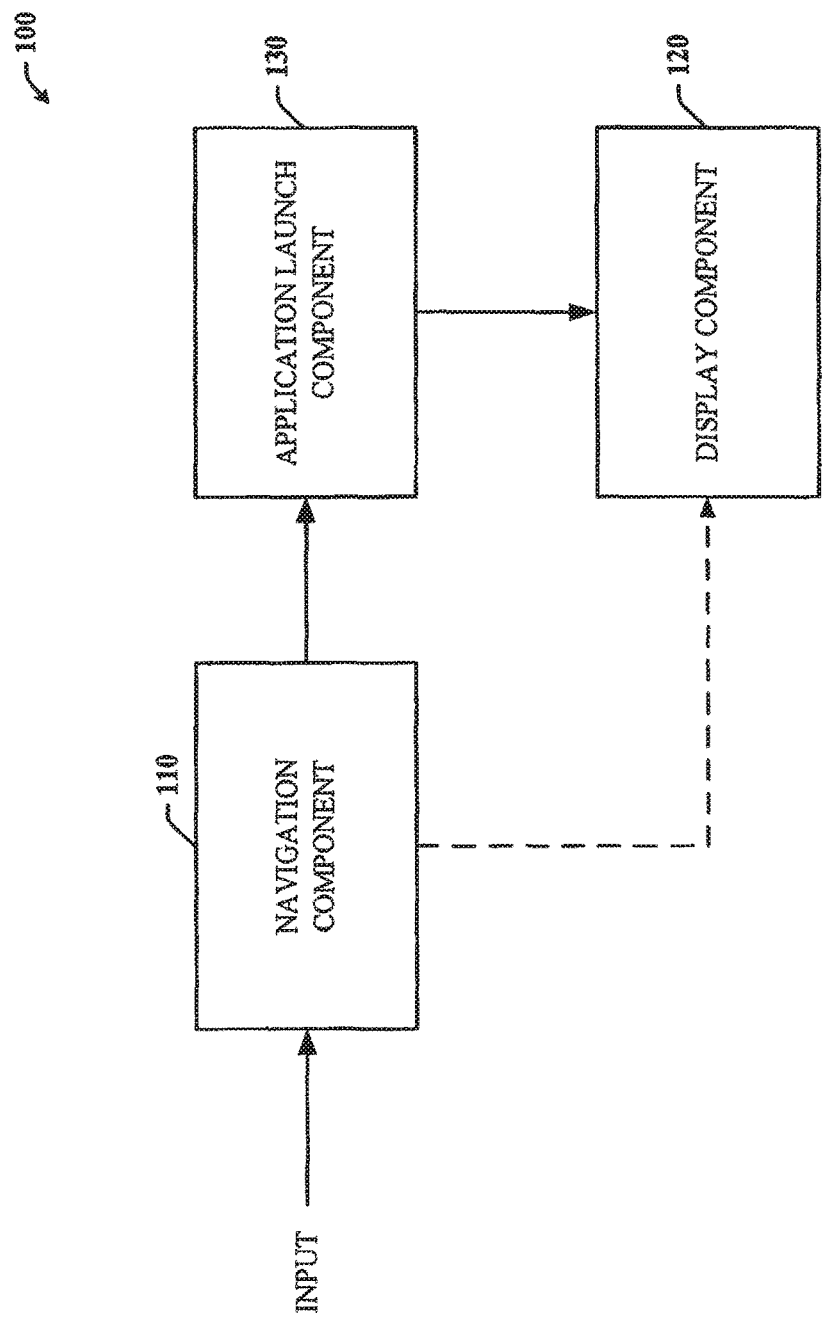
FIG. 1 is a high level block diagram of a navigational and display system that facilitates single-handed navigation of and improved visualization of information on a display space on for mobile computing devices in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and a computer. By way of illustration, both an application running on a server and the server can be a component. One or more components may reside within a process and/or thread of execution and a component may be localized on one computer and/or distributed between two or more computers.

Applications are typically launched by double clicking an icon, but this metaphor does not work well for handheld mobile devices. The subject invention as described herein, presents an improved user interface or display space for moving between and/or launching applications as well as for providing a visual indication of the application's current state. These and other details and aspects of the invention will now be described with respect to the following figures.

Referring now to FIG. 1, there is a general block diagram of a navigation and display system 100 that facilitates single-handed navigation and launching of applications with respect to mobile computing devices in accordance with an aspect of the subject invention. The system 100 includes a navigation component 110 that receives input from a user and changes a view of the content in the display space (via a display component 120) according to such input. For example, the navigation component 110 can include or be represented by a multi-directional on-screen control. The control can be operated directly by the user's touch (e.g., thumb press) or indirectly through the employment of one or more keypad buttons mapped to specified directions (e.g., up, down, left, right, upward left, upward right, etc.). The system 100 can operate on any type of mobile computing device including, but not limited to, a mobile phone, PDA, ultra-mobile tablet PC, smartphone, and/or pocket PC. Some of these devices make use of a touch screen for data input whereas some of the other devices accept input from a keypad, joystick, or other type of button control.

As the user provides input to the navigation component 110, the navigation component 110 can communicate the necessary data to the display component 120, which can respond by changing the content view of the display space. For instance, suppose that the user indicates movement to the right. In response, the display component can shift the view to the right to reveal content that was previously off the screen or can move a highlight box to the right to another object. When more or less detail of the current view is desired by the user, the display component can zoom in or out accordingly. Moreover, the navigation component can facilitate two-dimensional panning across the display space as well as zooming of the display space.

The navigation component 110 can also communicate with an application launch component 130. For instance, the user's input such as a tap on a relevant portion of the display space or a press of a keypad control can cause an application to launch or open. By launching an application, the user can interact more closely with the application. Thus, the user can visualize a wide range of details and interact with applications one at a time or together at once by single-handed activated controls.

Figure 2:
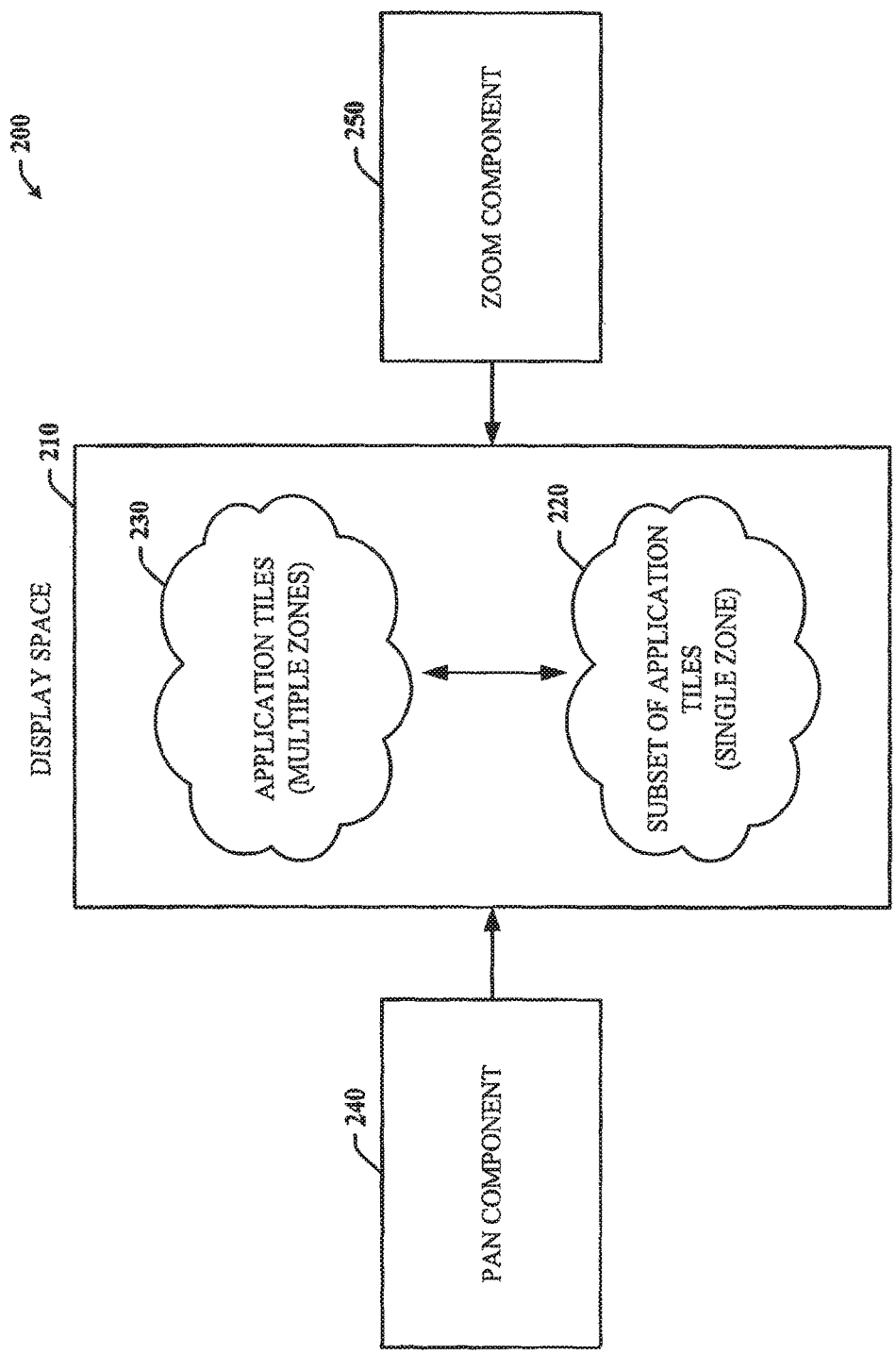
FIG. 2 is a block diagram of a navigational and display system that facilitates single-handed navigation of a display space on mobile computing devices in accordance with an aspect of the subject invention.

Referring now to FIG. 2, there is illustrated a block diagram of a navigation system 200 that facilitates single-handed interaction with content shown in a display space. The system 200 interacts with a display space 210 in a relatively uniform manner regardless of the type of mobile computing device. Thus, new hardware and/or software applications need not make substantial adaptations to make use of the system on different devices due to screen size, pixel count, and input control variations among the devices.

The display space 210 includes a plurality of application tiles that may be arranged in multiple zones or regions for easier interaction and viewing. The application tiles or zones can appear as a two-dimensional array in the display space. Each zone can be designated for particular types of applications such as carrier-provided applications (e.g., phone calls, voicemails), core applications (user configurable), data channels (e.g., stock quotes, weather), interfaces to ambient objects (e.g., home lighting), games, or other media channels (e.g., photo-viewing).

To support the different input hardware and various styles of interaction, there are several ways to pan around the display space 210 (via a pan component 240). If the device has a multi-directional control joystick—such as a directional control pad on a typical advanced cell phone, then the user can push the controller in the direction of the targeted zone. The pan component 240 can also drag across and/or around the canvas (display space) either to bring other application tiles into view or to highlight a different application tile. For example, if the device has a touch-sensitive display, the user can use his or her thumb to move about the zones. When doing so, the dragging action is "on rails", permitting the user to drag vertically and horizontally. It should be appreciated that diagonal movement can also be contemplated and performed.

In addition to panning, the display space 210 can toggle between a single-zone view 220 and a multiple zone view 230, for example, depending on the user's viewing preferences, by way of a zoom component 250. The zoom component 250 can be represented by an on-screen control and operated directly by a user's touch on touch-sensitive screens or indirectly by a numbered key on a keypad that has been mapped to the on-screen control. The zoom component 250 can zoom out to view all of the application tiles or can zoom in to view a subset of application tiles (e.g., at least one application tile).

To further facilitate the zoom operation, a "back" control can be included on-screen as well to take the user back to his/her previous view or screen. Otherwise, the user can press the zoom control to toggle back to the previous view (e.g., all application tiles or subset of application tiles). Depending on the zoom level, the application tiles can scale up or down in size and dimension; however the application tile remains interactive. For example, when scaled down to a minimum dimension, an application tile corresponding to the user's email may flash to notify the user that new email has just been received. However, when the application tile is viewed in a larger scale, the user may be able to see incoming email or at least the sender's name (e.g., in bold) associated with the new email.

In the next several figures, an exemplary user interface design is presented for purposes of describing various aspects of the subject invention and is not meant to limit the scope of the invention. The primary shell of the interactive display space can include 36 application tiles, for instance, which can be divided into 9 zones of 4 tiles each. The user interface can be viewed from a "home" view or a "world" view perspective whereby the home view displays 1 zone (e.g., 4 tiles) and the world view can show all 9 zones.

Figure 3:
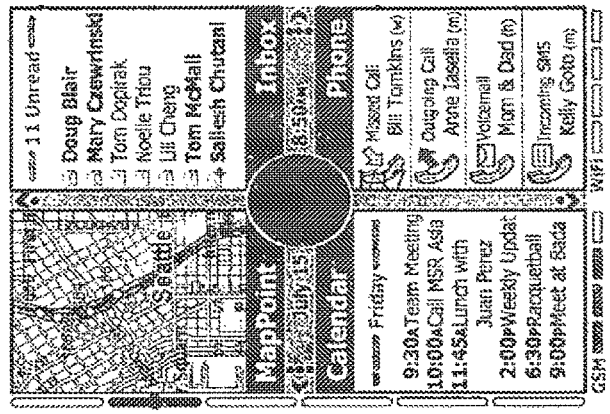
FIG. 3 is a representative view of one exemplary zone shown within a display space of a mobile computing device in accordance with an aspect of the subject invention.
Figure 4:
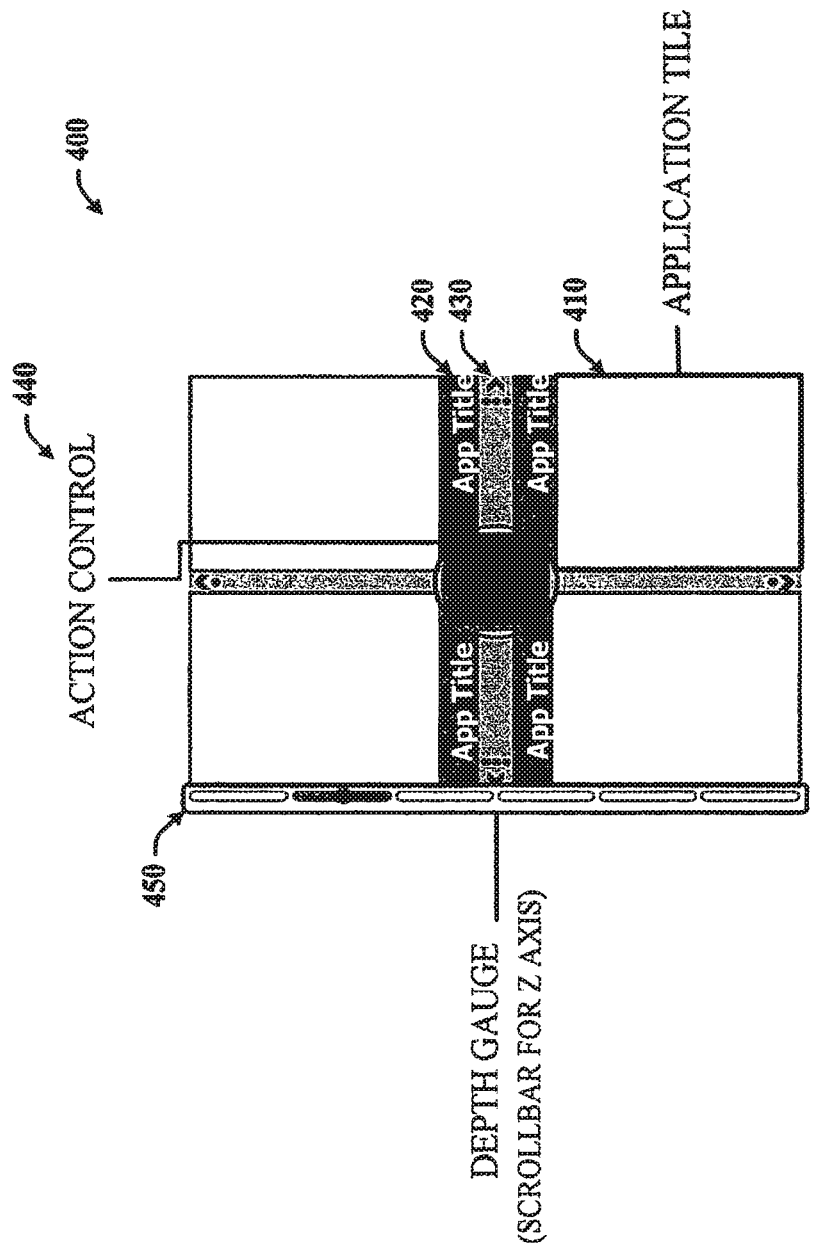
FIG. 4 is a schematic diagram of an exemplary zone shown within the display space of a mobile computing device in accordance with still another aspect of the subject invention.
Figure 5:
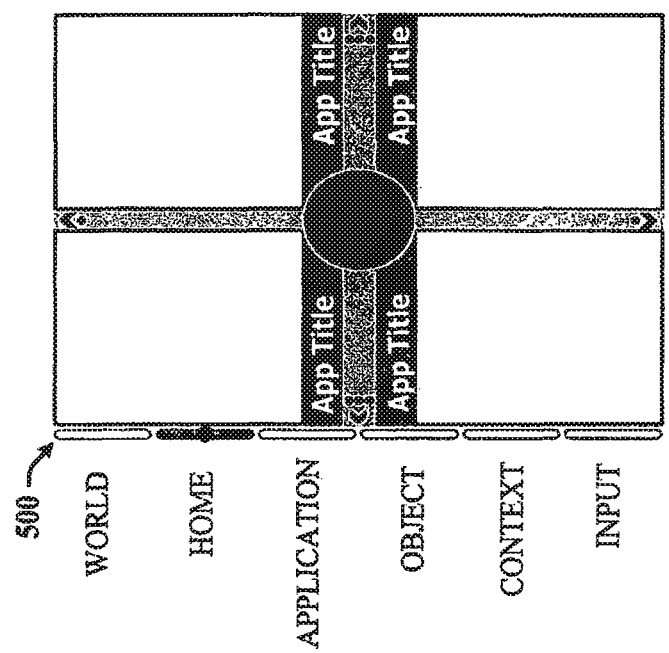
FIG. 5 is a schematic diagram of an exemplary zone having a zoom position indicator (depth gauge) shown within the display space of a mobile computing device in accordance with an aspect of the subject invention.

FIGS. 3-5 illustrate the home view. As demonstrated in FIG. 3, an exemplary home view 300 can include four different applications (e.g., map program, the user's inbox, the user's calendar, and the user's phone activity) which are scaled to consume most of the user interface. In general, the home view can represent the center-most cluster of tiles (e.g., zone) of all the tiles actually available for view (e.g., world view—see FIG. 8, infra). Thus, the home view 300 can represent the center-most zone (or tiles) of all the zones (or tiles) depicted in the world view. In most cases, the home view can be considered to include those applications which have the greatest importance to the user (e.g., in terms of need or access frequency). Alternatively, the user can designate which zone or cluster of tiles represents the home view 300—since a user's life circumstances can fluctuate or change.

FIGS. 4 and 5 illustrate various features associated with each zone of tiles. For example, each zone 400 can include four equally-sized tiles 410, whereby each tile is scalable to represent an application and its current state. Each tile can be identified by a title 420. Within each 4-tile zone, a position indicator 430 can show the user's relative location within the world view. The indicator can have two components. First, directional arrows show where other zones are. If the user only sees indicators pointing up and right, they know they are in zone 7 (e.g., with respect to a standard keypad configuration). Next to the directional arrows are blue dots that represent all zones not currently in view. The blue dots could also be used to indicate an alert or status change in a neighboring zone.

Furthermore, each zone can also include a central action control 440 to provide a consistent point of reference for zooming or panning navigation and to unify the zones and applications with a consistent visual metaphor. As will be shown later, onscreen tiles, menus, and functions can maintain a consistent relative position to the central action control 440.

When viewing a particular zone 400, the user can also maintain a frame of reference when zooming to various levels within an application by making use of a depth gauge 450. As shown in FIG. 5, the depth gauge 500 can quickly let the user the depth level of the current view. The levels can include (in order of most zoomed out to most zoomed in) world view, home view, application, object (within an application), context, and input. The level that is lit, highlighted, or colored can indicate the current depth.

Figure 6:
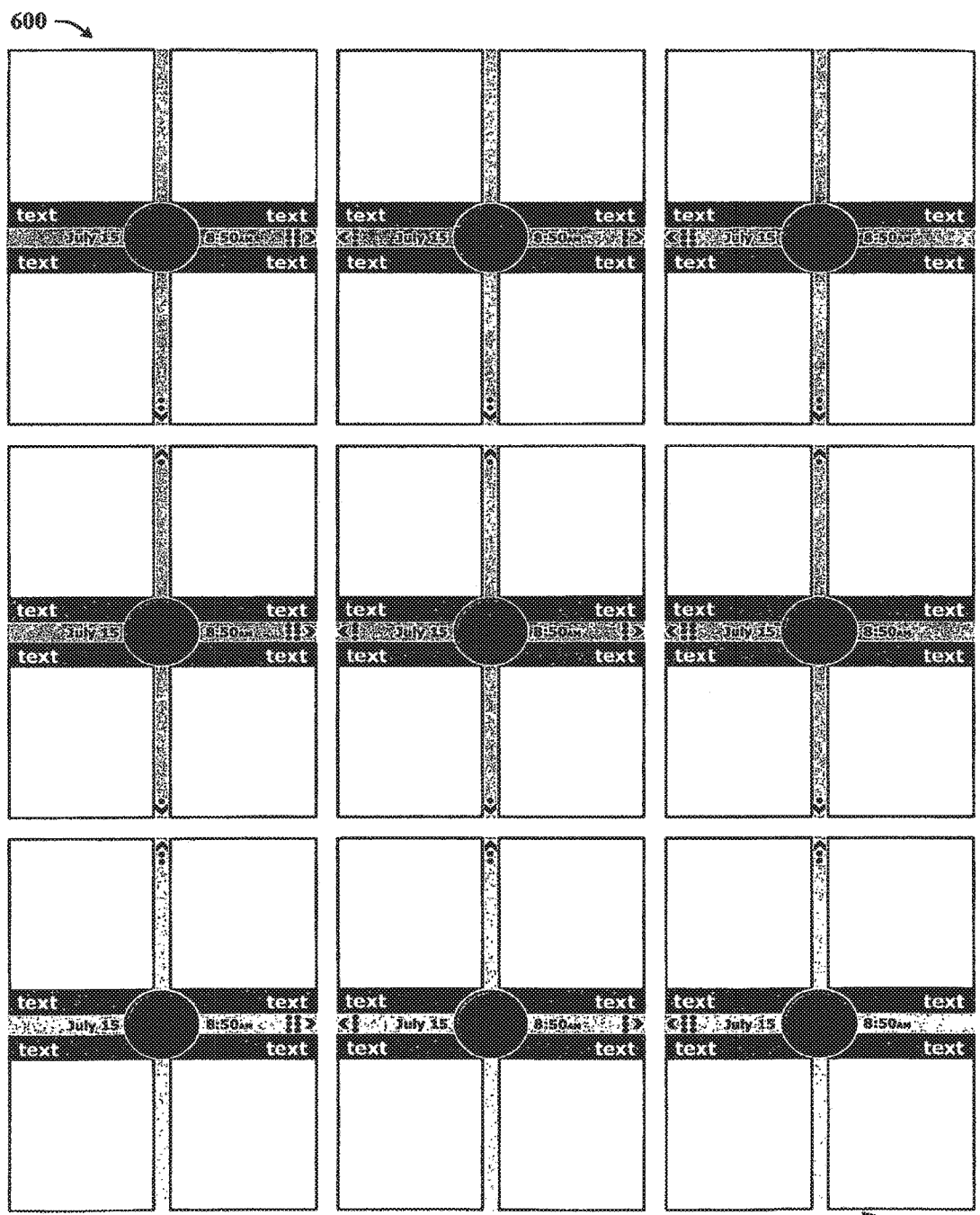
FIG. 6 is a schematic diagram of a plurality of zones shown within the display space of a mobile computing device in accordance with an aspect of the subject invention.
Figure 7:
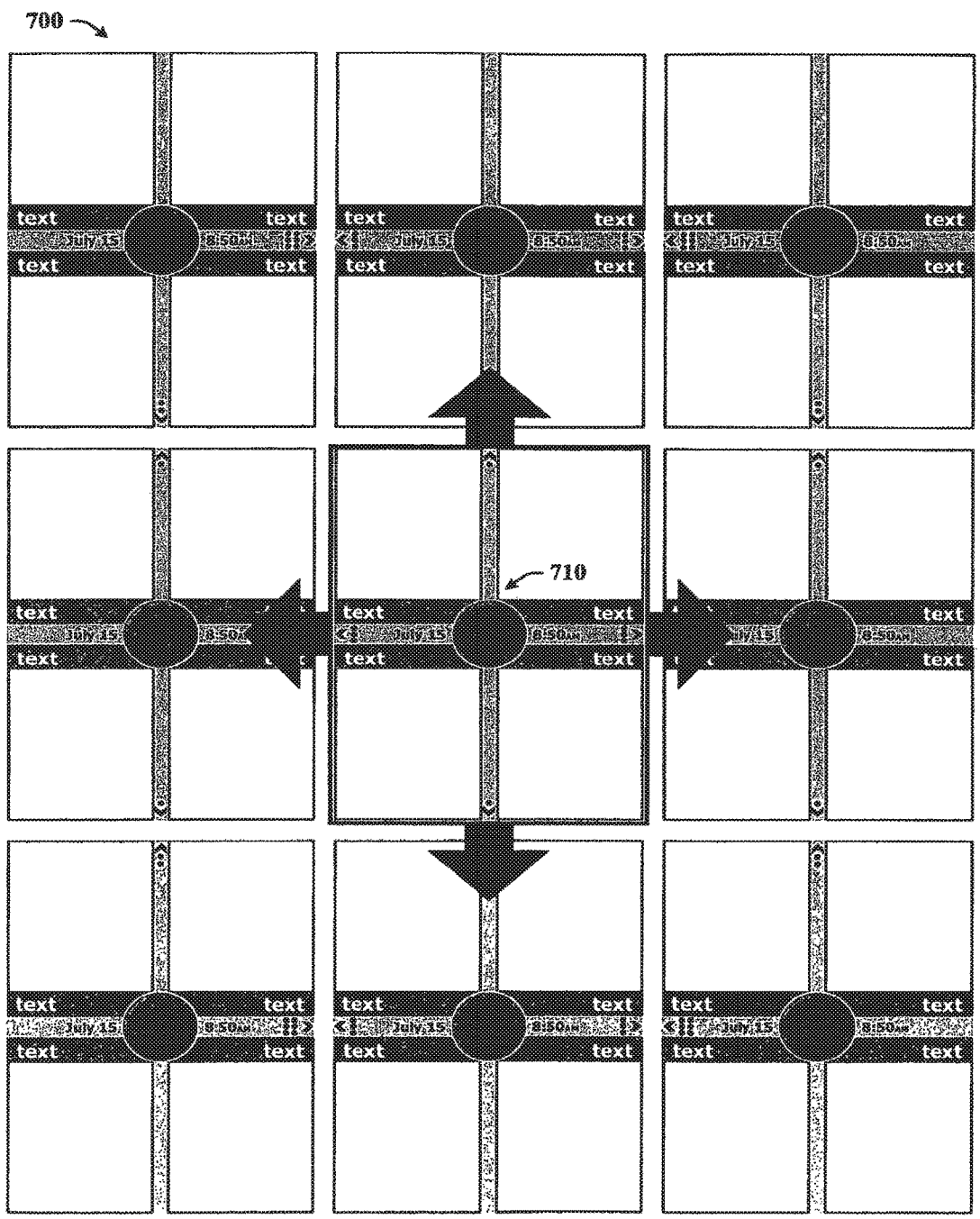
FIG. 7 is a schematic diagram of navigational movement between zones within the display space of a mobile computing device in accordance with an aspect of the subject invention.

Turning now to FIGS. 6 and 7, there are schematic diagrams of a world view 600 and navigation within the world view 700, respectively. In FIG. 6, the world view 600 includes 9 zones (610) with each zone having 4 application tiles as previously mentioned. The 9 zones can be mapped to correspond to the number keys on a keypad—beginning from the upper left zone, going across. Panning across the zones in the world view 700 can be accomplished in part by a user dragging his thumb, for example, across the screen in an up/down or left/right motion over the desired zones. To view any one particular zone in more detail, a single tap on the zone, and in particular, on the central action control 710 can be performed. When initially viewing (or returning to) the world view 700, the highlighted box may be found on the center-most zone (e.g., home zone). This design permits the user to quickly access the 4 highest priority tiles (presumably in the center) with single-press interaction.

When panning, the central action control within each zone remains stationary and snaps the view to the center of each zone—represented by an empty circular space in the hub of 4 tiles in the zone. These virtual guides help keep the user from getting caught between zones. Alternatively, the user can press the directional indicator (430) to pan around the screen. An oversized hit target ensures that the user can easily hit this indicator without using a stylus.

Figure 8:
FIG. 8 illustrates a representative view of exemplary zones and their corresponding application tiles as shown in the display space of a mobile computing device in accordance with an aspect of the subject invention.
Figure 9:
FIG. 9 illustrates navigation through the exemplary zones of FIG. 8 which is shown in the display space of a mobile computing device in accordance with an aspect of the subject invention.

FIGS. 8 and 9 illustrate practical user interfaces 800, 900, respectively, having a plurality of applications loaded thereon that can be employed by a user. In particular, the user interface 900 displays panning between applications or zones.

Figure 10:
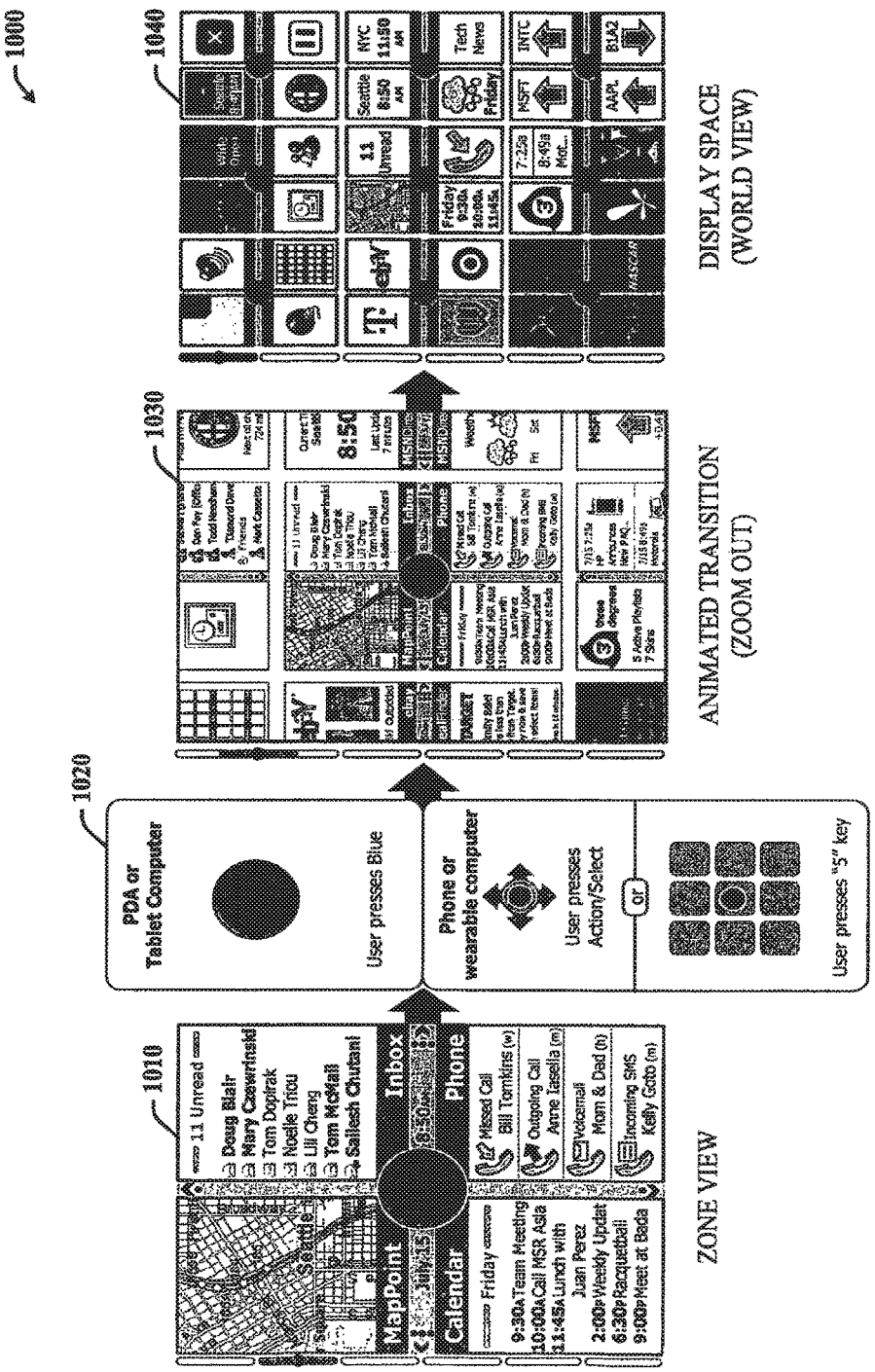
FIG. 10 is a schematic diagram illustrating zooming out from one zone to a plurality of zones on a mobile computing device in accordance with an aspect of the subject invention.
Figure 11:
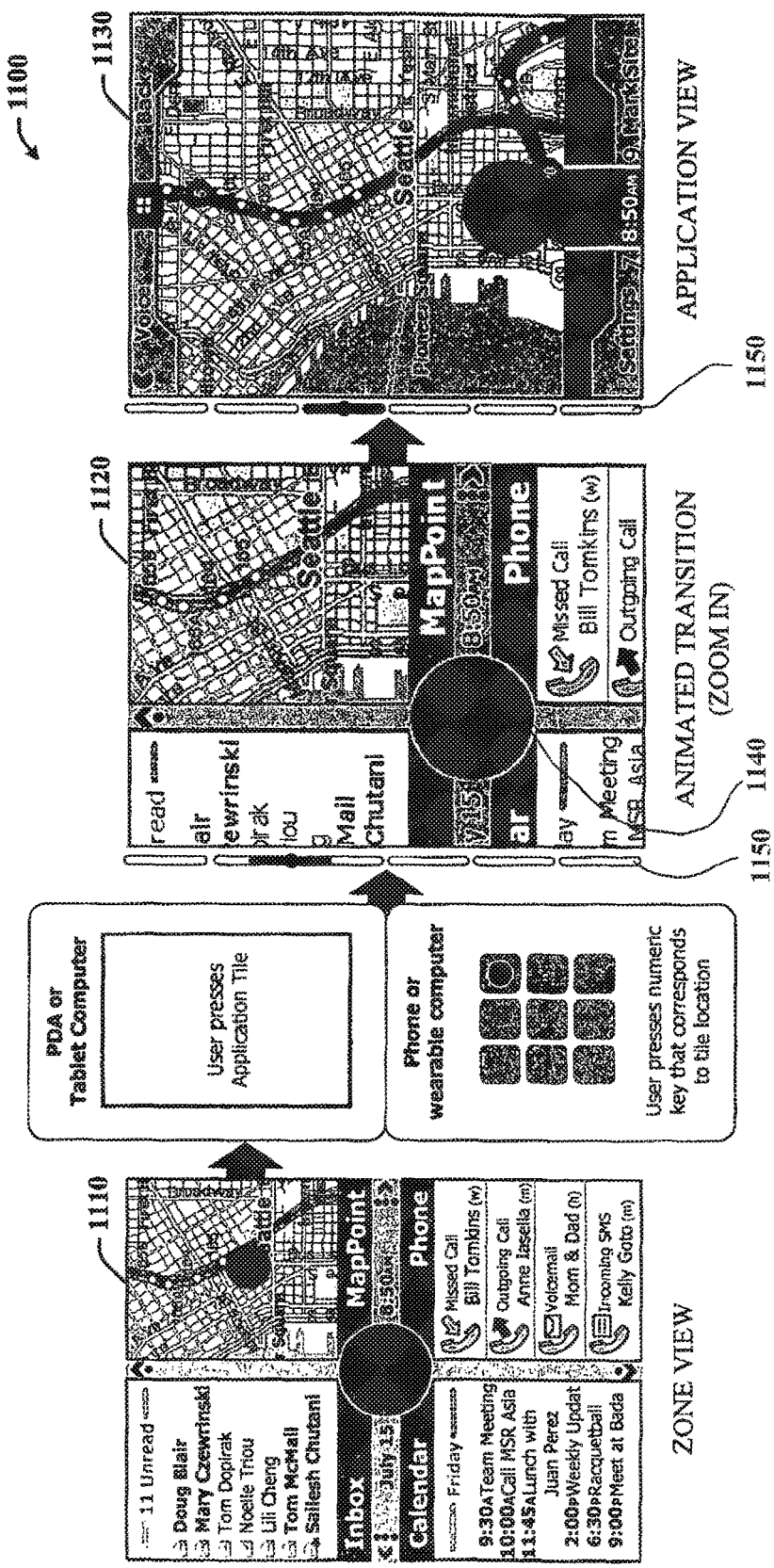
FIG. 11 is a schematic diagram illustrating zooming in from one exemplary zone to a particular application included in that zone in accordance with an aspect of the subject invention.

Moving on to FIGS. 10 and 11, there are shown two different zoom navigation sequences (1000, 1100). In FIG. 10, a user can zoom out from a zone view 1010 by pressing on a designated control 1020. For example, on PDAs or tablet computers having touch-sensitive screens, the user can press or tap on a central action control (e.g., 440 in FIG. 4, supra). For mobile phones or other type of wearable computing device, the user can press or tap on a designated button or other specific numeric key on a keypad. For example, the number "5" key on a standard keypad can be programmed or mapped to perform a zoom function. After the zoom out is initiated, the zone view 1010 in the display screen can transition (1030) in an animated manner to a world view 1040.

Conversely, the user can zoom into an application from a zone view 1110 as demonstrated in the sequence 1100 of FIG. 11. From any zone, the user taps any of the 4 notification tiles to launch the corresponding application. The point of view follows a zooming animation (1120) further (or deeper) into the display space until the target application fills the entire display (1130). If the device has only a standard numeric keypad (no touch-screen), the user simply presses the numeric key in the corner that corresponds to the zone. For example, pressing 1 launches the upper left tile, pressing 3 launches the upper right, pressing 7 launches the lower left, and pressing 9 launches the lower right tile. This provides quick, single-tap access to each visible tile.

As the system zooms, the central action control 1140 stays in view and retains its function as a central point of reference. Application menu commands can be represented as on-screen buttons clustered around the central action control 1140, now positioned at the bottom of the display (1130). Each menu button (e.g., load map, overlay, settings, and mark site) has its appropriate numeric label to further illustrate its mapping to a mobile phone keypad. This can allow a smartphone user to access application commands by pressing the corresponding keypad number. In addition, a visual indicator 1150 to the left of the screen (or display space) animates during interaction to reflect the user's current absolute zoom level within this environment.

Turning now to FIGS. 12-14, there are shown different aspects of an exemplary world view. As previously described, the world view can include 36 application tiles grouped into 9 zones or regions. FIG. 12 illustrates a world view 1200 with empty application tiles (e.g., no specific applications are associated therewith). FIG. 13 represents a world view 1300 after a user has "associated" most of the application tiles with a particular application. The applications can include carrier applications, data channels, links to ambient objects, games, media applications, etc. When the state of any one of the applications changes in some way, the relevant application tiles can flash or light up to get the user's attention. The world view 1400 depicts a plurality of flashing application tiles (appear in color). For example, an application tile associated with a retail store can flash when a sale is taking place (and/or the user is located in the vicinity of the store). Because all of the application tiles (e.g., 36) are visible in the world view, each application tile may now appear as a miniature visualization of the application. Thus, for an email application, the application tile may only show "9 unread" to indicate that 9 messages have not been read instead of actually showing a portion of the inbox that may include a list of senders. Thus, the information provided in each application tile is optimized accordingly based on the current size of the tile.

Referring now to FIGS. 15-19, there are illustrated various schematic views of a display space when mapped to a numeric keypad—such as would be found on a mobile phone or smartphone. Each of the views demonstrates the mapping of the numeric keys to the 9 possible zones in this environment. In FIGS. 15-17, the view is centered on different zones. For example, FIG. 15 shows that the view is centered on the home zone identified by the "5" key. In FIG. 16, the view is centered on zone 2 by tapping on the "2" key and on zone 6 in FIG. 17 by tapping on the "6" key. Unlike these previous figures, the view in FIG. 18 is centered on an application tile (17) within zone 6. When the display space is centered on a particular view (zone view or application view), the location of the remaining zones or application tiles surrounding the centered view can be determined by looking at a number of different position indicators on the screen. For instance, the depth gauge can readily let the user know how deep into the display space he/she currently is (e.g., at the application level versus the zone level). When the user zooms out from any zone view, the world view can be displayed on the screen to show all zones as indicated in FIG. 19.

Various methodologies in accordance with the subject invention will now be described via a series of acts, it is to be understood and appreciated that the subject invention is not limited by the order of acts, as some acts may, in accordance with the subject invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject invention.

Figure 20:
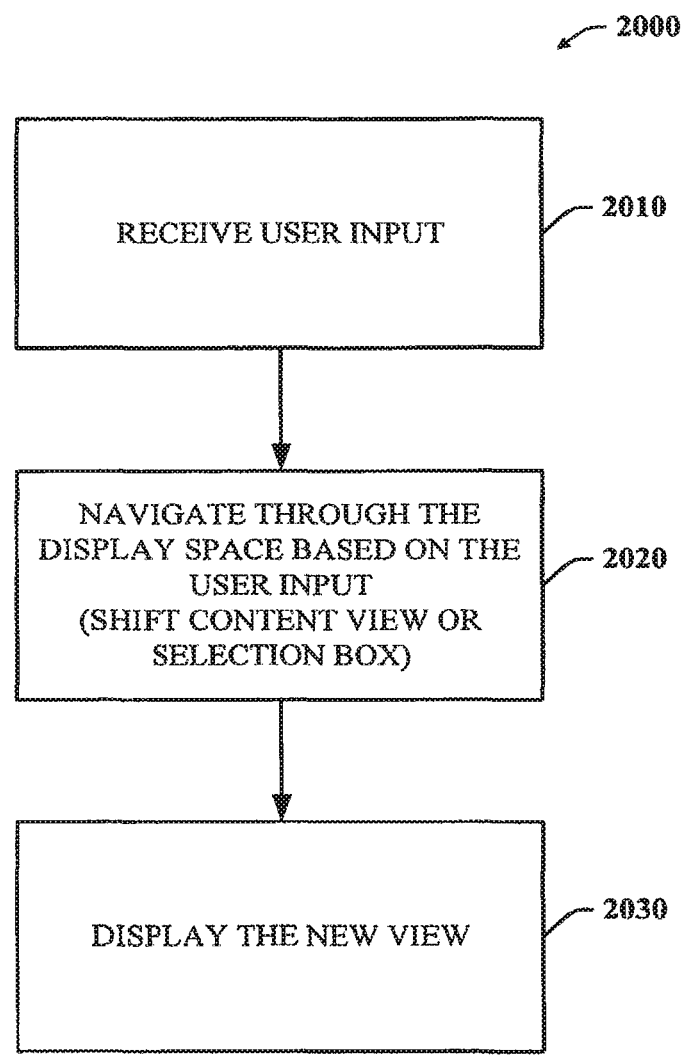
FIG. 20 is a flow chart illustrating an exemplary methodology that facilitates single-handed navigation of a display space for mobile computing devices in accordance with an aspect of the subject invention.

Referring now to FIG. 20, there is a flow diagram of a navigation method 2000 that facilitates single-handed navigational interaction with a plurality of applications on any type of mobile computing device. The method 2000 involves receiving user input at 2010 and navigating through the content in a display space based on the user's input at 2020. The user's input can be provided single-handedly such as through the employment of the user's thumb. With his/her thumb, the user can pan in multiple directions to view or select different application tiles. In addition, the user can press or tap on designated controls using only the thumb to zoom to various depths (along the z-axis) of the display space. For instance, the user can zoom in from a world view to a zone view and then again zoom in to an application and then zoom out back to the zone view and/or the world view.

After processing the user's input, a view of the content can be displayed to the user 2030, whereby the view displayed can depend on the user's input and the type of navigation invoked by such input. For example, the input can call for the method 2000 to pan to a specific zone view or to zoom in to a desired application or zoom out to view a world view of the display space. The view resulting from the user's input can be represented to the user along with any transitional views through animation. Thus, the shift or change in views occurs in a fluid-like and smooth manner.

Figure 21:
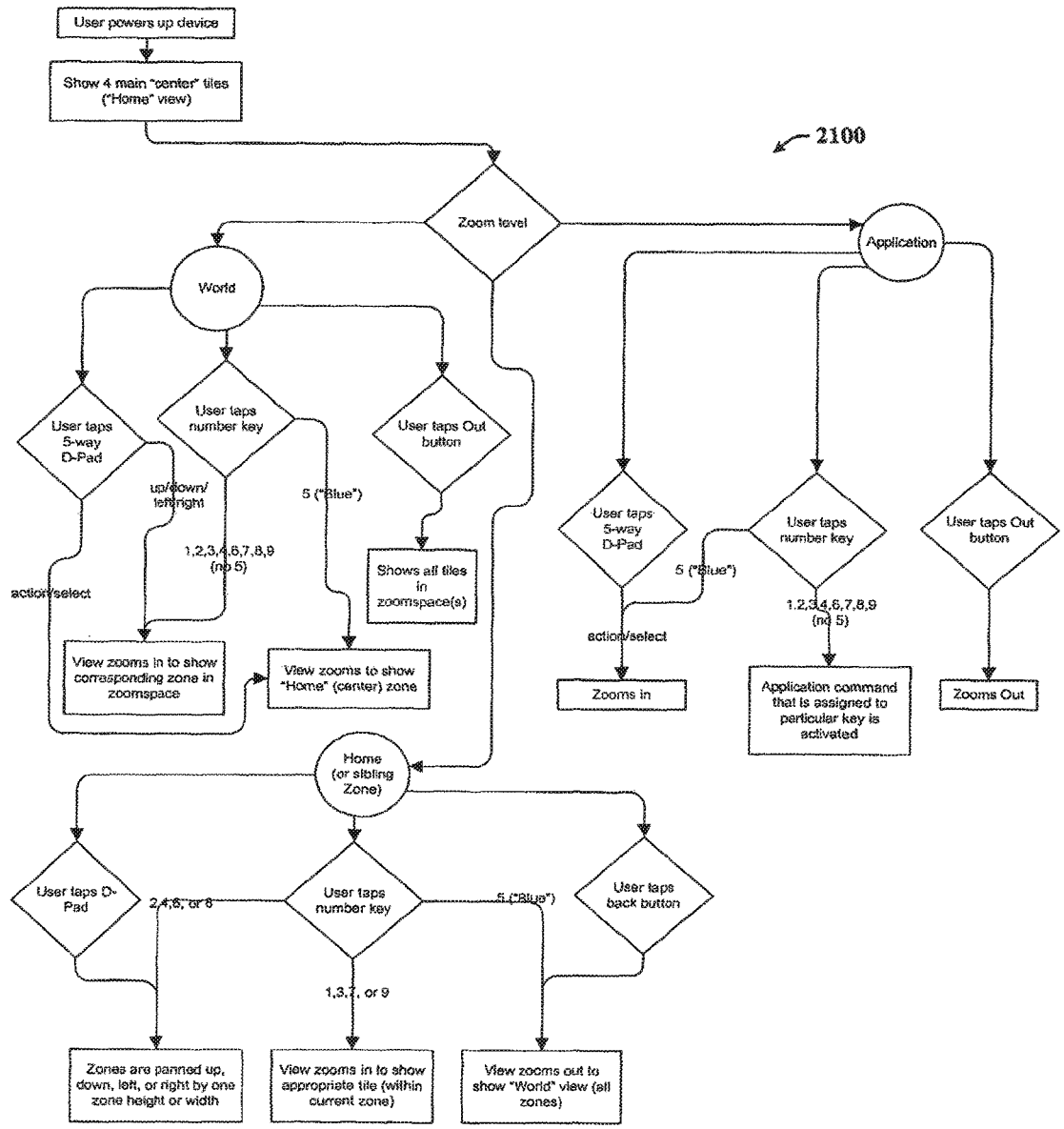
FIG. 21 is an illustration of a logic diagram for single-handed navigation of applications on a non-touch screen mobile computing device (e.g., mobile phone) in accordance with an aspect of the subject invention.
Figure 22:
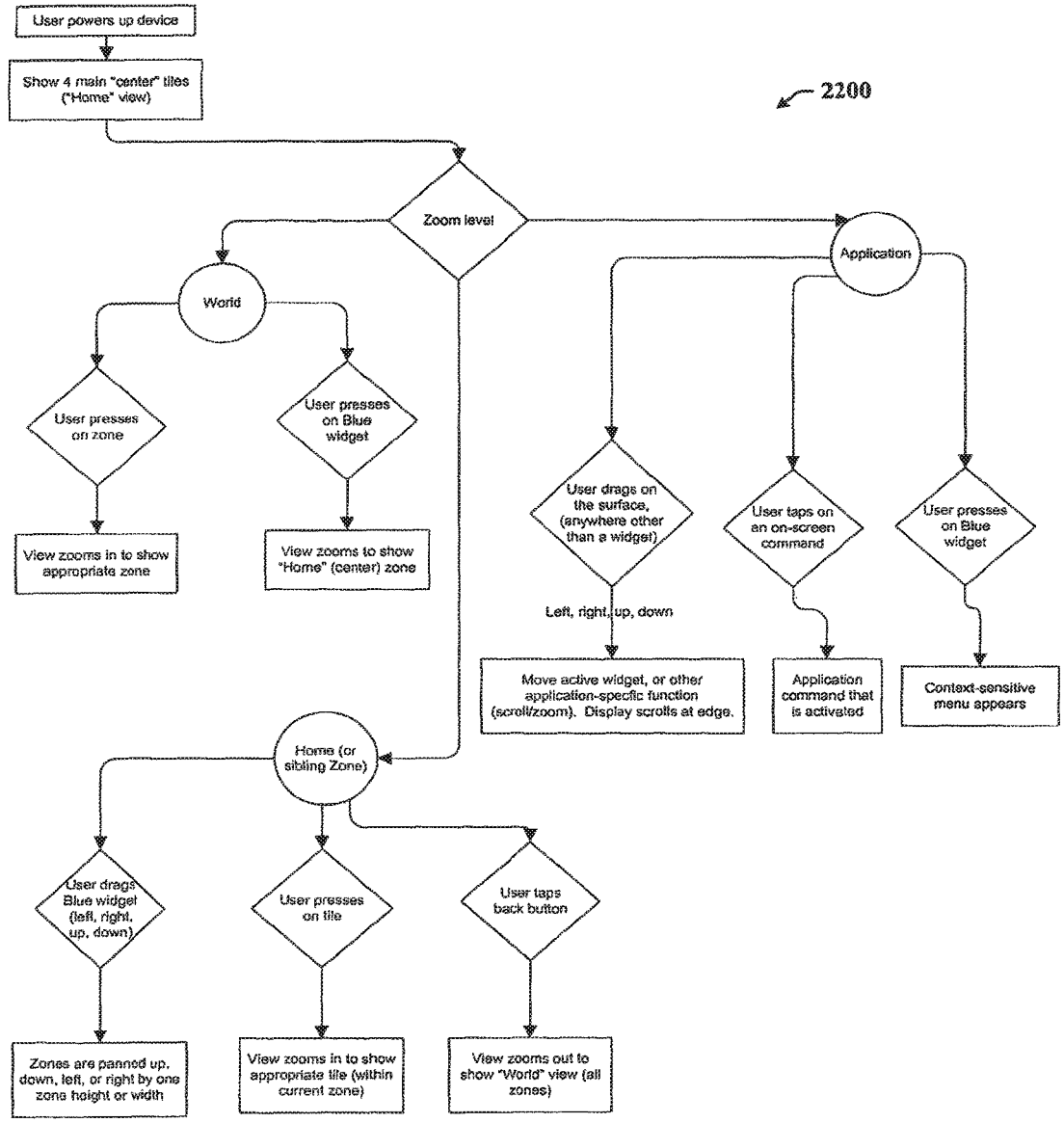
FIG. 22 is an illustration of a logic diagram for single-handed navigation of applications on a touch screen mobile computing device (e.g., PDA, tablet PC) in accordance with an aspect of the subject invention.

Finally, FIGS. 21 and 22 depict exemplary logic schemes 2100 and 2200 that can be employed to facilitate single-handed navigation of applications and objects on non-touch-screen mobile phone devices and on touch-screen PDAs or tablet computing devices, respectively.

Figure 23:
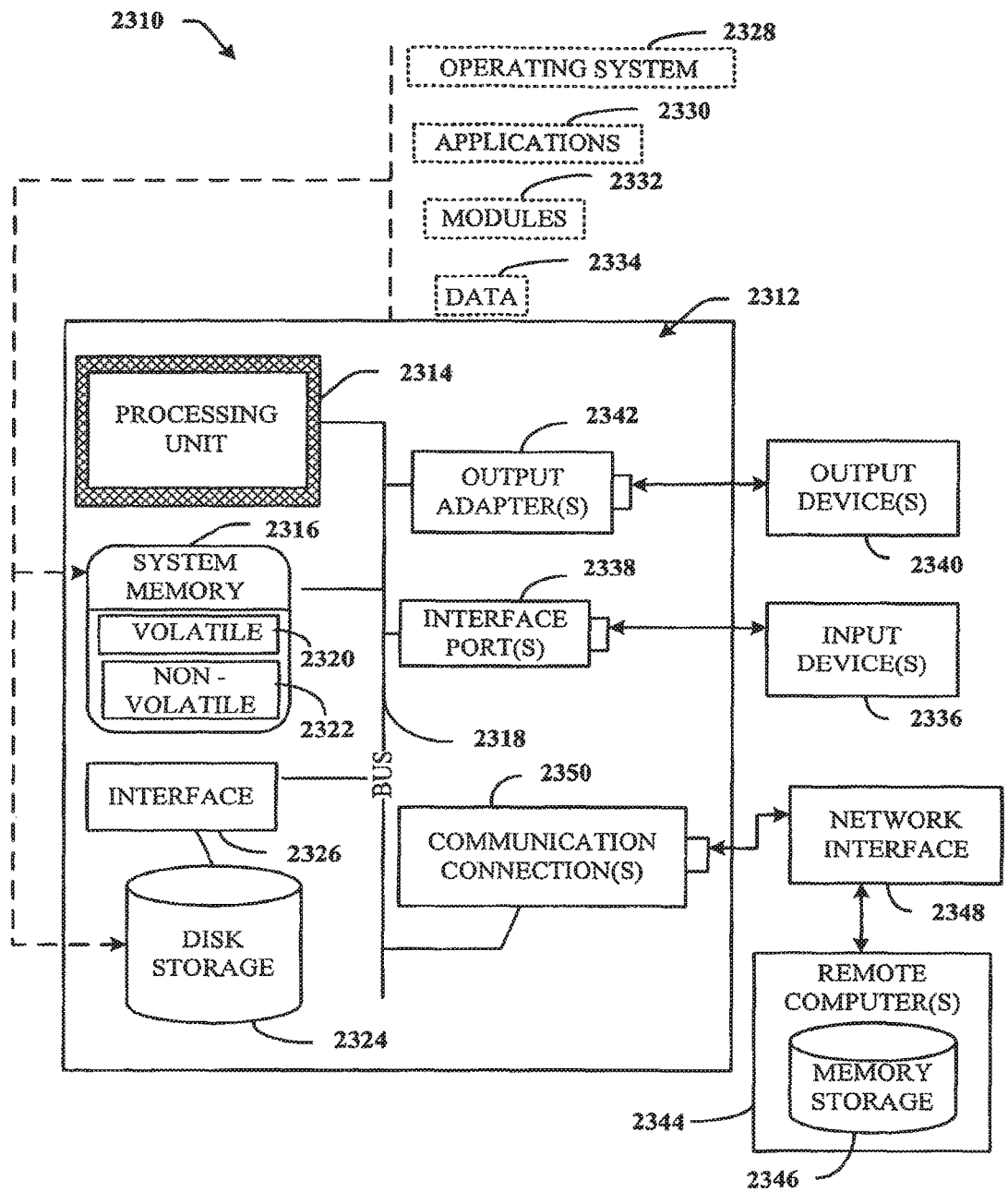
FIG. 23 illustrates an exemplary environment for implementing various aspects of the invention.

In order to provide additional context for various aspects of the subject invention, FIG. 23 and the following discussion are intended to provide a brief, general description of a suitable operating environment 2310 in which various aspects of the subject invention may be implemented. While the invention is described in the general context of computer-executable instructions, such as program modules, executed by one or more computers or other devices, those skilled in the art will recognize that the invention can also be implemented in combination with other program modules and/or as a combination of hardware and software.

Generally, however, program modules include routines, programs, objects, components, data structures, etc. that perform particular tasks or implement particular data types. The operating environment 2310 is only one example of a suitable operating environment and is not intended to suggest any limitation as to the scope of use or functionality of the invention. Other well-known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 23, an exemplary environment 2310 for implementing various aspects of the invention includes a computer 2312. The computer 2312 includes a processing unit 2314, a system memory 2316, and a system bus 2318. The system bus 2318 couples system components including, but not limited to, the system memory 2316 to the processing unit 2314. The processing unit 2314 can be any of various available processors. Dual microprocessors and other multiprocessor architectures also can be employed as the processing unit 2314.

The system bus 2318 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2316 includes volatile memory 2320 and nonvolatile memory 2322. The basic input/output system (BIOS), containing the basic routines to transfer information between elements within the computer 2312, such as during start-up, is stored in nonvolatile memory 2322. By way of illustration, and not limitation, nonvolatile memory 2322 can include read only memory (ROM), programmable ROM (PROM), electrically programmable ROM (EPROM), electrically erasable ROM (EEPROM), or flash memory. Volatile memory 2320 includes random access memory (RAM), which acts as external cache memory. By way of illustration and not limitation, RAM is available in many forms such as static RAM (SRAM), dynamic RAM (DRAM), static DRAM (SDRAM), double data rate SDRAM (DDR SDRAM), enhanced SDRAM (ESDRAM), Synchlink DRAM (SLDRAM), and direct Rambus (DRDRAM).

Computer 2312 also includes removable/nonremovable, volatile/nonvolatile computer storage media. FIG. 23 illustrates, for example a disk storage 2324. Disk storage 2324 includes, but is not limited to, devices like a magnetic disk drive, floppy disk drive, tape drive, Jaz drive, Zip drive, LS-100 drive, flash memory card, or memory stick. In addition, disk storage 2324 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2324 to the system bus 2318, a removable or non-removable interface is typically used such as interface 2326.

It is to be appreciated that FIG. 23 describes software that acts as an intermediary between users and the basic computer resources described in suitable operating environment 2310. Such software includes an operating system 2328. Operating system 2328, which can be stored on disk storage 2324, acts to control and allocate resources of the computer system 2312. System applications 2330 take advantage of the management of resources by operating system 2328 through program modules 2332 and program data 2334 stored either in system memory 2316 or on disk storage 2324. It is to be appreciated that the subject invention can be implemented with various operating systems or combinations of operating systems.

A user enters commands or information into the computer 2312 through input device(s) 2336. Input devices 2336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2314 through the system bus 2318 via interface port(s) 2338. Interface port(s) 2338 include, for example, a serial port, a parallel port, a game port, and a universal serial bus (USB). Output device(s) 2340 use some of the same type of ports as input device(s) 2336. Thus, for example, a USB port may be used to provide input to computer 2312 and to output information from computer 2312 to an output device 2340. Output adapter 2342 is provided to illustrate that there are some output devices 2340 like monitors, speakers, and printers among other output devices 2340 that require special adapters. The output adapters 2342 include, by way of illustration and not limitation, video and sound cards that provide a means of connection between the output device 2340 and the system bus 2318. It should be noted that other devices and/or systems of devices provide both input and output capabilities such as remote computer(s) 2344.

Computer 2312 can operate in a networked environment using logical connections to one or more remote computers, such as remote computer(s) 2344. The remote computer(s) 2344 can be a personal computer, a server, a router, a network PC, a workstation, a microprocessor based appliance, a peer device or other common network node and the like, and typically includes many or all of the elements described relative to computer 2312. For purposes of brevity, only a memory storage device 2346 is illustrated with remote computer(s) 2344. Remote computer(s) 2344 is logically connected to computer 2312 through a network interface 2348 and then physically connected via communication connection 2350. Network interface 2348 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2350 refers to the hardware/software employed to connect the network interface 2348 to the bus 2318. While communication connection 2350 is shown for illustrative clarity inside computer 2312, it can also be external to computer 2312. The hardware/software necessary for connection to the network interface 2348 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
    at a wearable computing device with a touch screen display and a plurality of applications:
    displaying a first application in the plurality of applications on the display, without displaying any other applications in the plurality of applications besides the first application;
    detecting activation of a zoom control;
    in response to detecting activation of the zoom control, displaying an animation that transitions from displaying the first application in the plurality of applications on the display, without displaying any other applications in the plurality of applications, to displaying a first group of application objects, wherein:
    the plurality of applications has a corresponding plurality of application objects;
    each application object in the plurality of application objects corresponds to a single application in the plurality of applications;
    application objects in the plurality of application objects are arranged in a two-dimensional array;
    the first group of application objects is a subset of the plurality of application objects;
    activation of a respective application object in the plurality of application objects causes an application that corresponds to the respective application object to be displayed on the display, without displaying any other applications in the plurality of applications; and
    at least one application object in the plurality of application objects displays an indication of a current state of a corresponding application;
    while displaying the first group of application objects, detecting a single finger drag across the touch screen display;
    in response to detecting the single finger drag across the touch screen display while displaying the first group of application objects, panning to display a second group of application objects in the plurality of application objects, distinct from the first group of application objects;
    detecting activation of a second zoom control;
    in response to detecting activation of the second zoom control, displaying all of the plurality of application objects in the two-dimensional array including a center-most cluster of application objects at a center of the two-dimensional array;
    while displaying all of the plurality of the application objects, detecting activation of a button configured to display the center-most cluster in the two-dimensional array; and,
    in response to detecting activation of the button configured to display the center-most cluster in the two-dimensional array, displaying the center-most cluster of application objects in the two-dimensional array, wherein:
    displaying the center-most cluster of application objects displays less than all of the plurality of application objects, and
    multiple application objects in the center-most cluster of application objects are user configurable.

2. The method of claim 1, including:
    displaying the center-most cluster of application objects in the two-dimensional array when the two-dimensional array is initially displayed.

3. The method of claim 1, wherein application objects in the center-most cluster of application objects correspond to frequently used applications.

4. The method of claim 1, wherein the center-most cluster of application objects includes a map application, an email application, a calendar application, and/or a phone application.

5. The method of claim 1, wherein the center-most cluster of application objects includes frequently used applications.

6. The method of claim 1, wherein display of the at least one application object flashes when there is a change in the current state of the corresponding application.

7. The method of claim 1, wherein the plurality of application objects includes a store application object that visually changes to indicate when a corresponding store is having a sale.

8. The method of claim 1, wherein the plurality of application objects includes a store application object that visually changes to indicate when the wearable computing device is in a vicinity of a corresponding store.

9. A wearable computing device, comprising:
a touch screen display;
one or more processors;
memory; and
programs, including a plurality of applications, wherein the programs are stored in the memory and configured to be executed by the one or more processors, the programs including instructions to:
display a first application in the plurality of applications on the display, without displaying any other applications in the plurality of applications besides the first application;
detect activation of a zoom control;
in response to detecting activation of the zoom control, display an animation that transitions from displaying the first application in the plurality of applications on the display, without displaying any other applications in the plurality of applications, to displaying a first group of application objects, wherein:
the plurality of applications has a corresponding plurality of application objects;
each application object in the plurality of application objects corresponds to a single application in the plurality of applications;
application objects in the plurality of application objects are arranged in a two-dimensional array;
the first group of application objects is a subset of the plurality of application objects;
activation of a respective application object in the plurality of application objects causes an application that corresponds to the respective application object to be displayed on the display, without displaying any other applications in the plurality of applications; and
at least one application object in the plurality of application objects displays an indication of a current state of a corresponding application;
while displaying the first group of application objects, detect a single finger drag across the touch screen display;
in response to detecting the single finger drag across the touch screen display while displaying the first group of application objects, pan to display a second group of application objects in the plurality of application objects, distinct from the first group of application objects;
detect activation of a second zoom control;
in response to detecting activation of the second zoom control, display all of the plurality of application objects in the two-dimensional array including a center-most cluster of application objects at a center of the two-dimensional array;
while displaying all of the plurality of the application objects, detect activation of a button configured to display the center-most cluster in the two-dimensional array; and,
in response to detecting activation of the button configured to display the center-most cluster in the two-dimensional array, display the center-most cluster of application objects in the two-dimensional array, wherein:

displaying the center-most cluster of application objects displays less than all of the plurality of application objects, and
multiple application objects in the center-most cluster of application objects are user configurable.

10. The device of claim 9, wherein application objects in the center-most cluster of application objects correspond to frequently used applications.

11. The device of claim 9, wherein the center-most cluster of application objects includes a map application, an email application, a calendar application, and/or a phone application.

12. The device of claim 9, wherein the center-most cluster of application objects includes frequently used applications.

13. The device of claim 9, wherein display of the at least one application object flashes when there is a change in the current state of the corresponding application.

14. The device of claim 9, wherein the plurality of application objects includes a store application object that visually changes to indicate when a corresponding store is having a sale.

15. The device of claim 9, wherein the plurality of application objects includes a store application object that visually changes to indicate when the wearable computing device is in a vicinity of a corresponding store.

16. The device of claim 9, wherein the device includes instructions to:
display the center-most cluster of application objects in the two-dimensional array when the two-dimensional array is initially displayed.

17. A non-transitory computer readable storage medium storing programs, including a plurality of applications, the programs comprising instructions, which when executed by a wearable computing device with a touch screen display, cause the device to:
display a first application in the plurality of applications on the display, without displaying any other applications in the plurality of applications besides the first application;
detect activation of a zoom control;
in response to detecting activation of the zoom control, display an animation that transitions from displaying the first application in the plurality of applications on the display, without displaying any other applications in the plurality of applications, to displaying a first group of application objects, wherein:
the plurality of applications has a corresponding plurality of application objects;
each application object in the plurality of application objects corresponds to a single application in the plurality of applications;
application objects in the plurality of application objects are arranged in a two-dimensional array;
the first group of application objects is a subset of the plurality of application objects;
activation of a respective application object in the plurality of application objects causes an application that corresponds to the respective application object to be displayed on the display, without displaying any other applications in the plurality of applications; and
at least one application object in the plurality of application objects displays an indication of a current state of a corresponding application;
while displaying the first group of application objects, detect a single finger drag across the touch screen display;

in response to detecting the single finger drag across the touch screen display while displaying the first group of application objects, pan to display a second group of application objects in the plurality of application objects, distinct from the first group of application objects;

detect activation of a second zoom control;

in response to detecting activation of the second zoom control, display all of the plurality of application objects in the two-dimensional array including a center-most cluster of application objects at a center of the two-dimensional array;

while displaying all of the plurality of the application objects, detect activation of a button configured to display the center-most cluster in the two-dimensional array; and, in response to detecting activation of the button configured to display the center-most cluster in the two-dimensional array, display the center-most cluster of application objects in the two-dimensional array, wherein:

displaying the center-most cluster of application objects displays less than all of the plurality of application objects, and multiple application objects in the center-most cluster of application objects are user configurable.

18. The computer readable storage medium of claim 17, wherein the computer readable storage medium includes instructions, which when executed by the wearable computing device with the touch screen display, cause the device to: display the center-most cluster of application objects in the two-dimensional array when the two-dimensional array is initially displayed.

19. The computer readable storage medium of claim 17, wherein application objects in the center-most cluster of application objects correspond to frequently used applications.

20. The computer readable storage medium of claim 17, wherein the center-most cluster of application objects includes a map application, an email application, a calendar application, and/or a phone application.

21. The computer readable storage medium of claim 17, wherein the center-most cluster of application objects includes frequently used applications.

22. The computer readable storage medium of claim 17, wherein display of the at least one application object flashes when there is a change in the current state of the corresponding application.

23. The computer readable storage medium of claim 17, wherein the plurality of application objects includes a store application object that visually changes to indicate when a corresponding store is having a sale.

24. The computer readable storage medium of claim 17, wherein the plurality of application objects includes a store application object that visually changes to indicate when the wearable computing device is in a vicinity of a corresponding store.

* * * * *